United States Patent
Kim et al.

(10) Patent No.: US 11,625,574 B2
(45) Date of Patent: Apr. 11, 2023

(54) METHOD FOR GENERATING ABNORMAL DATA

(71) Applicant: MakinaRocks Co., Ltd., Seoul (KR)

(72) Inventors: Ki Hyun Kim, Yongin-si (KR); Jong Seob Jeon, Bucheon-si (KR); Sangwoo Shim, Sokcho-si (KR)

(73) Assignee: MakinaRocks Co., Ltd., Seoul (KR)

( * ) Notice: Subject to any disclaimer, the term of this patent is extended or adjusted under 35 U.S.C. 154(b) by 0 days.

(21) Appl. No.: 17/083,212

(22) Filed: Oct. 28, 2020

(65) Prior Publication Data
US 2021/0124989 A1 Apr. 29, 2021

(30) Foreign Application Priority Data

Oct. 28, 2019 (KR) .................. 10-2019-0134214
Feb. 24, 2020 (KR) .................. 10-2020-0022452

(51) Int. Cl.
*G06N 3/08* (2023.01)
*G06F 1/00* (2006.01)
*G06N 3/045* (2023.01)
*G06N 3/084* (2023.01)
*G06F 18/211* (2023.01)
(Continued)

(52) U.S. Cl.
CPC ........... *G06N 3/045* (2023.01); *G06F 18/211* (2023.01); *G06F 18/214* (2023.01);
(Continued)

(58) Field of Classification Search
CPC .. G06K 9/6228; G06K 9/6218; G06K 9/6256; G06K 9/6262; G06K 9/6268;
(Continued)

(56) References Cited

U.S. PATENT DOCUMENTS 10,496,884 B1 * 12/2019 Nguyen ............. G06V 30/1916
10,832,093 B1 * 11/2020 Taralova ............... G06F 18/217
(Continued)

FOREIGN PATENT DOCUMENTS

KR         20180055708 A      5/2018
KR    10-2018-0110566 A     10/2018
(Continued)

OTHER PUBLICATIONS

Thulasidasan, et al., "On Mixup Training: Improved Calibration and Predictive Uncertainty for Deep Neural Networks," Los Alamos National Laboratory, Department of Electrical and Computer Engineering, University of Washington, May 27, 2019, pp. 10.
(Continued)

*Primary Examiner* — John W Lee
(74) *Attorney, Agent, or Firm* — Seed IP Law Group LLP

(57) ABSTRACT

In an exemplary embodiment of the present disclosure, disclosed is a computer program stored in a computer readable storage medium executable by one or more processors, in which when the computer program is executed by one or more processors of a computing device, the computer program performs operations below for processing data, the operations may include: selecting a plurality of different data from a data set including data formed of one or more feature groups, transforming a part of each data among the plurality of selected data, assigning a label to each of the plurality of transformed data, and computing the transformed data by using the model.

16 Claims, 8 Drawing Sheets

(51) Int. Cl.
*G06F 18/23* (2023.01)
*G06F 18/214* (2023.01)
*G06F 18/21* (2023.01)
*G06F 18/241* (2023.01)

(52) U.S. Cl.
CPC ............ *G06F 18/217* (2023.01); *G06F 18/23* (2023.01); *G06F 18/241* (2023.01); *G06N 3/084* (2013.01)

(58) Field of Classification Search
CPC .... G06K 9/6271; G06N 3/084; G06N 3/0454; G06N 3/08
See application file for complete search history.

(56) References Cited

U.S. PATENT DOCUMENTS

| | | | | |
|---|---|---|---|---|
| 2012/0019520 A1* | 1/2012 | Suzuki | ................ | H04N 13/271 345/419 |
| 2013/0063625 A1* | 3/2013 | Yamanaka | .............. | G06T 7/215 348/E5.051 |
| 2013/0329965 A1* | 12/2013 | Tian | ........................ | G06V 30/40 382/112 |
| 2016/0286120 A1* | 9/2016 | Kuo | ........................ | H04N 13/25 |
| 2019/0301979 A1 | 10/2019 | Kawanoue et al. | | |
| 2020/0019852 A1 | 1/2020 | Yoon et al. | | |
| 2020/0250795 A1* | 8/2020 | Han | .................... | G06V 10/255 |

FOREIGN PATENT DOCUMENTS

KR   10-2018-0133657 A   12/2018
KR      10-1940029 B1    1/2019

OTHER PUBLICATIONS

Yun, et al., "CutMix: Regularization Strategy to Train Strong Classifiers with Localizable Features," Researchgate, 1905.04899v1 [cs.CV], May 13, 2019, pp. 14.

* cited by examiner

METHOD FOR GENERATING ABNORMAL DATA

CROSS-REFERENCE TO RELATED APPLICATIONS

This application claims priority to and the benefit of Korean Patent Application No. 10-2020-0022452, filed in the Korean Intellectual Property Office on Feb. 24, 2020, and claims priority to and the benefit of Korean Patent Application No. 10-2019-0134214, filed in the Korean Intellectual Property Office on Oct. 28, 2019, the entire contents of which are incorporated herein by reference.

BACKGROUND

Technical Field

The present disclosure relates to an artificial intelligence technology field, and more particularly, to a method of processing data by utilizing artificial intelligence.

Description of the Related Art

As sensor data that can be temporarily used or permanently used by being stored in a database is accumulated, research on the automated processing of monitoring data of numerous industrial equipment is being conducted. In order to implement the method of determining a state of the data, research on the artificial intelligence technology using an artificial neural network is being conducted.

A deep learning model utilizing an artificial neural network provides a method of effectively learning complex non-linear or dynamic panels, but there exists a technical problem for update of a model when data to be processed is changed.

Korean Patent Application Laid-Open No. 10-2018-0055708 discloses a method of processing an image by utilizing artificial intelligence.

BRIEF SUMMARY

The present disclosure is conceived in response to the background art, and has been made in an effort to provide a method of processing data by utilizing artificial intelligence.

According to an exemplary embodiment of the present disclosure for solving the object, a computer program stored in a computer readable storage medium is disclosed. When the computer program is executed by one or more processors of a computing device, the computer program performs operations to provide methods for processing data, and the operations include: selecting a plurality of different data in a data set including data formed of one or more feature groups; transforming a part of each data among the selected different data; assigning a label to each transformed data; and calculating the transformed data using a model.

In an alternative exemplary embodiment, the plurality of different data may be formed of data included in the same cluster or different clusters.

In the alternative exemplary embodiment, the operations may further include generating a plurality of data subsets through clustering data of the data set.

In the alternative exemplary embodiment, the generating a plurality of data subsets through clustering data of the data set may be processed from a classification model trained by using a cost function based on triplet loss.

In the alternative exemplary embodiment, each data subset in the plurality of data subsets may include different data having a normal pattern.

In the alternative exemplary embodiment, the transforming of the part of each data from the selected different data may include an operation of changing a value for one feature group among one or more feature groups in each data.

In the alternative exemplary embodiment, the transforming of the part of each data from the selected different data may include an operation of exchanging a value for one data and a value for another data among the plurality of data.

In the alternative exemplary embodiment, the exchanging a value for one data and a value for another data among the plurality of data may include an operation of exchanging values for one or more feature groups in one data and values for one or more feature groups in another data among the plurality of data.

In the alternative exemplary embodiment, the exchanging of the value for one data and the value for another data among the plurality of data may include an operation of exchanging values for data belonging to the same feature group in each data.

In the alternative exemplary embodiment, the data included in the data set may be normal data.

In the alternative exemplary embodiment, the assigning of the label to each transformed data may include an operation of assigning an abnormal label to each transformed data.

In the alternative exemplary embodiment, the calculating of the transformed data using the model may include an operation of testing performance of the model through calculating the transformed data using the model.

In the alternative exemplary embodiment, the testing of the performance of the model through calculating the transformed data using the model may include an operation of testing performance of the model based on whether the model determines the transformed data to be abnormal.

In the alternative exemplary embodiment, each feature group may be formed of items associated among a plurality of items included in the data.

According to another exemplary embodiment of the present disclosure, a method for processing data performed in a computing device including one or more processors is disclosed. The method may include: selecting a plurality of different data in a data set including data formed of one or more feature groups; transforming a part of each data among the selected different data; assigning a label to each transformed data; and calculating the transformed data using a model.

According to still another exemplary embodiment of the present disclosure, a computing device is disclosed. The computing device may include: one or more processors; and a memory storing commands executable in processor, in which the processor is configured to: select a plurality of different data in a data set including data formed of one or more feature groups; transform a part of each data among the selected different data; assign a label to each transformed data; and calculate the transformed data using a model.

According to yet another exemplary embodiment of the present disclosure, a computer readable recording medium storing a data structure storing data related to a training process of a neural network model is disclosed. The data is revised by a computer program, and the computer program performs operations to provide methods for processing data, and the operations include: selecting a plurality of different data in a data set including data formed of one or more feature groups; transforming a part of each data among the selected different data; and assigning a label to each transformed data.

The present disclosure may provide a method of processing data by utilizing artificial intelligence.

BRIEF DESCRIPTION OF THE SEVERAL VIEWS OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

DETAILED DESCRIPTION

Figure 1:
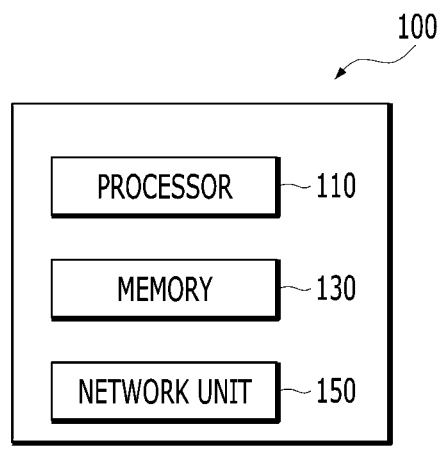
FIG. 1 is a block diagram illustrating a computing device for performing a data processing method according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component," "module," "system," and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or," not exclusive "or." That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function, an artificial neural network, and a neural network may be interchangeably used.

All of the contents included in Korean Patent Application Nos. 10-2018-0080482, 10-2019-0050477, and 10-2019-0067175 filed on Jul. 11, 2018, Apr. 30, 2019, and Jun. 7, 2019 are incorporated in the present specification as reference.

FIG. 1 is a block diagram illustrating a computing device for performing a data processing method according to an exemplary embodiment of the present disclosure.

The configuration of the computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

According to the exemplary embodiment of the present disclosure, the computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning.

The processor 110 may read a computer program stored in the memory 130 and perform a data processing method according to an exemplary embodiment of the present disclosure. According to the exemplary embodiment of the present disclosure, the processor 110 may perform a computation for training a neural network model. The processor 110 may perform a calculation, such as processing of input data for learning in Deep Learning (DN), extraction of a feature from input data, an error calculation, and updating of a weight of the neural network by using backpropagation, for training the neural network. At least one of the CPU, GPGPU, and TPU of the processor 110 may process training of the network function. For example, the CPU and the GPGPU may process training of the network function and data classification by using a network function together.

In the exemplary embodiment of the present disclosure, the training of the network function and the data classification by using a network function may be processed by using the processors of the plurality of computing devices together. Further, the computer program executed in the computing device according to the exemplary embodiment of the present disclosure may be a CPU, GPGPU, or TPU executable program.

In the exemplary embodiment of the present disclosure, the computing device 100 may distribute and process the network function by using at least one of a CPU, a GPGPU, or a TPU. Further, in the exemplary embodiment of the present disclosure, the computing device 100 may also distribute and process the network function together with another computing device. The description of specific contents for the distribution and the processing of the network function of the computing device 100 is discussed in detail in U.S. patent application Ser. No. 15/161,080 (filed on May 20, 2016) and Ser. No. 15/217,475 (filed on Jul. 22, 2016) the entirety of which is incorporated by reference in the present application.

The processor 110 may acquire a data set including one or more pieces of data to be trained. In the exemplary embodiment of the present disclosure, the data processed by using the neural network model may include all types of data acquired in industrial fields. For example, the data processed by using the neural network model may include an operation parameter of a device for producing a product in a producing process of a product, sensor data acquired by an operation of a device, and the like. For example, in the case of a process setting a temperature of equipment and using a laser in a specific process, a wavelength of the laser and the like may be included in the kind of data processed in the present disclosure. For example, the processed data may include lot equipment history data from a Management Execution System (MES), data from equipment interface data source, processing tool recipes, processing tool test data, probe test data, electric test data, combination measurement data, diagnosis data, remote diagnosis data, post-processing data, and the like, and the present disclosure is not limited thereto. As a more specific example, the processed data may include work-inprogress information including about 120,000 items per lot acquired from a semiconductor fab, raw processing tool data, equipment interface information, process metrology information (for example, including about 1,000 items per lot), defect information accessible by a yield-related engineer, operation test information, sort information (including datalog and bitmap), but the present disclosure is not limited thereto. The foregoing description of the kind of data is merely illustrative, and the present disclosure is not limited thereto.

In the exemplary embodiment of the present disclosure, the computing device 100 may preprocess the collected data. The computing device 100 may supplement a missing value among the collected data. For example, the computing device 100 may supplement a missing value with an intermediate value or an average value, or may also delete a column including the plurality of missing values. For example, a subject matter expertise of a manager may be utilized in the data preprocessing by the computing device 100 for matrix completion. For example, the computing device 100 may remove values that are completely out of bounds and limits (for example, values estimated due to malfunctions of sensors) from the collected data. Further, the computing device 100 may adjust a value of data so that the data has a similar scale while maintaining a characteristic. The computing device 100 may apply, for example, standardization of data in the unit of column. The computing device 100 may also simplify the processing by removing a column irrelevant to the processing of the neural network model from the data. In the exemplary embodiment of the present disclosure, the computing device 100 may perform an appropriate input data preprocessing method for easiness of the training of the neural network model for generating a classification model and active learning. Descriptions of specific examples regarding the types, examples, preprocessing, conversion, and the like of the input data are specifically discussed in U.S. patent application Ser. No. 10/194,920 (filed on Jul. 12, 2002) the entirety of which is incorporated by reference in the present application.

The input data of the exemplary embodiment of the present disclosure may include all types of data acquired in the industrial sites as described above. For example, the input data may include an operation parameter of a device for producing a product in a producing process of a product, sensor data acquired by an operation of a device, and the like. One input data may include data acquired while manufacturing a product using one manufacturing recipe in one manufacturing equipment. The data acquired while manufacturing the product may include sensor data. That is, an input data set including entire input data may include data acquired while manufacturing a product by using one or more manufacturing recipes in one or more manufacturing equipment (that is, data for various manufacturing equipment and various manufacturing recipes may be mixed, so that the input data set may have multiple normal states), but each input data is the data acquired in the production of the product by one manufacturing recipe in one manufacturing equipment and may have one normal state.

In the exemplary embodiment of the present disclosure, the manufacturing equipment may include predetermined manufacturing equipment for producing a product in an industrial site, and include, for example, semiconductor manufacturing equipment, but the present disclosure is not limited thereto.

In the exemplary embodiment of the present disclosure, the manufacturing recipe may be configured with a method of producing a product in an industrial site, and more particularly, may include data for controlling manufacturing equipment. In the exemplary embodiment of the present disclosure, the manufacturing recipe may include, for example, a semiconductor manufacturing recipe loaded to manufacturing equipment, but the present disclosure is not limited thereto.

The memory 130 may store a computer program for performing the data processing method according to the exemplary embodiment of the present disclosure, and the stored computer program may be read and driven by the processor 110.

The network unit 150 may transceive data for performing the data processing method according to the exemplary embodiment of the present disclosure and the like with another computing device, a manufacturing device, a server, and the like. The network unit 150 may enable communication between a plurality of computing devices to enable the plurality of computing devices to perform distributed processing on data processing using the neural network model.

The processor 110 may acquire a data set including one or more pieces of data to be trained. As described above, in the exemplary embodiment of the present disclosure, the data may include the predetermined types of data acquired in the industrial site, and the processor 110 may acquire data from another computing device, manufacturing equipment, and the like. One or more pieces of acquired data may configure a data set, and the data set may be a set of data used in a computation of one epoch of the training of the neural network model.

The data set may include labeled data and unlabeled data. The unlabeled data may be labeled by the data processing method of the exemplary embodiment of the present disclosure, and the data processing method of the exemplary embodiment of the present disclosure may label unlabeled data, thereby increasing a ratio of the labeled data included in the data set and improving performance of the model.

That is, in an initial data set, only a part of the data may be labeled, but unlabeled data may be additionally labeled by the data processing method of the exemplary embodiment of the present disclosure.

A data subset is a subset of the data set and may include one or more pieces of data, and the data subset may be formed of the data selected based on a predetermined reference. In the present disclosure, the data set may also be formed of only normal data. Each of the plurality of data subsets may include different data of a normal pattern. For example, the training data in the present disclosure may be sensor data acquired in a semiconductor producing process and an operation parameter of producing equipment. In this case, when setting of the producing equipment in the semiconductor producing process (for example, a change in a wavelength of a laser emitted in a specific process) is changed (that is, the recipe is changed), sensor data acquired after the change in the setting may be included in a data subset that is different from that of the sensor data acquired before the change in the setting.

The processor 110 may select a plurality of different data in the data set including the data formed of one or more feature groups. The plurality of different data may be formed of data included in different clusters.

The data may be formed of a plurality of items. Each of the plurality of items may be classified into the feature group according to a predetermined reference. The predetermined reference for classifying the plurality of items of the data into the feature group may be the predetermined reference that may discriminate the value of the data from another value. In particular, the feature group may be formed of associated items among the plurality of items included in the data. For example, the data may be formed of the plurality of feature groups in which the values of the same form are grouped. Further, the data may be formed of the plurality of feature groups in which the values acquired from the same sensor are grouped. Further, the data may be formed of the plurality of feature groups in which the values acquired from the same monitoring module are grouped.

For particular example, the data may be formed of the plurality of sensing values for the sensor data acquired in the semiconductor producing process, the operation parameter of the producing equipment, and the like. The data may be formed of temperature sensor data, angle sensor data of a first joint of a robot's arm, angle sensor data of a second joint of the robot's arm, and the like. In this case, for example, the temperature sensor data may have a plurality of items when the plurality of temperature sensors is present. In this case, the temperature sensor data may be classified into one feature group. In this case, the values of the temperature sensor data and the values of the angle sensor data of the first joint are formed of the different types of values (that is, the values of the different units, such as a temperature and an angle), so that the values of the temperature sensor data and the values of the angle sensor data of the first joint may be classified into different feature groups. Further, the value of the angle sensor data of the first joint and the value of the angle sensor data of the second joint are acquired from the different sensors or monitoring modules, so that the value of the angle sensor data of the first joint and the value of the angle sensor data of the second joint may be classified into the different feature groups. That is, the values of the temperature sensor data may be classified into a first feature group, the values of the angle sensor data of the first joint may be classified into a second feature group, and the values of the angle sensor data of the second joint may be classified into a third feature group. That is, the values having the same types or acquired through the same sensor or the same monitoring module are the correlated data, so that the values may be classified into the same feature group. The foregoing description of the temperature sensor data and the joint angle sensor data is merely illustrative, and the present disclosure is not limited thereto.

Figure 2:
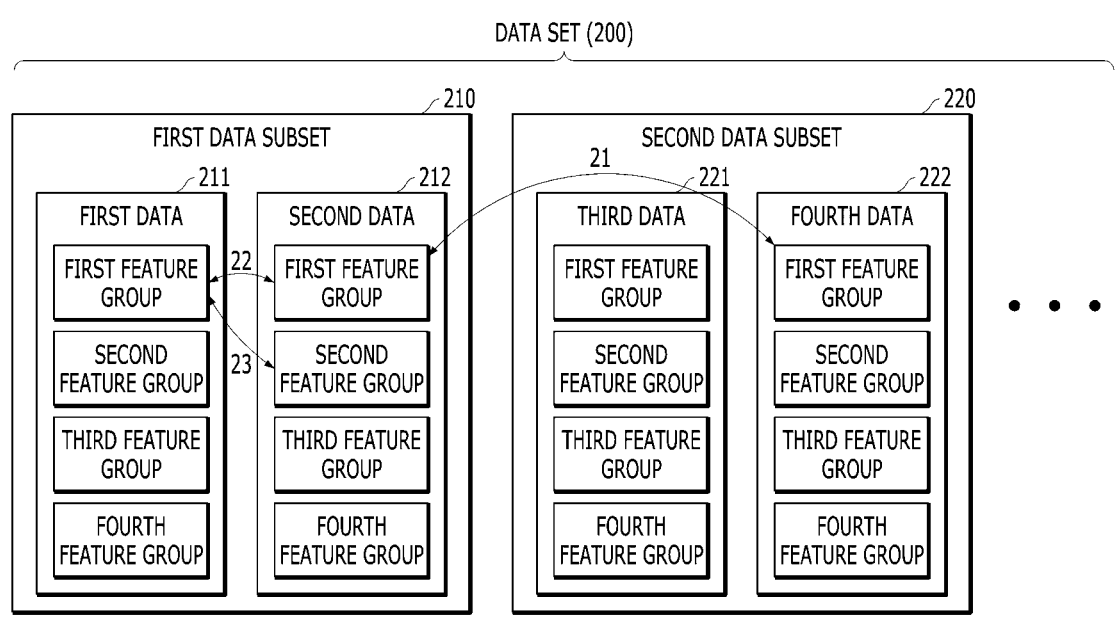
FIG. 2 is a schematic diagram illustrating a network function according to the exemplary embodiment of the present disclosure.

In particular, referring to FIG. 2, the processor 110 may select the plurality of different data from the data set 200 including the data formed of one or more feature groups. For example, the processor 110 may select one or more data among the data included in a first data subset 210 and one or more data among the data included in a second data subset 220, which are classified into the different clusters. The data included in the different clusters (that is, the data included in each data subset) may be the data clustered based on the same reference.

For particular example, the data set including the plurality of data of the present disclosure may be sensor data acquired in a semiconductor producing process and an operation parameter of producing equipment. In this case, when setting of the producing equipment (for example, a change in a wavelength of a laser emitted in a specific process) is changed in the semiconductor producing process (that is, the recipe is changed), sensor data acquired after the change in the setting may be included in a data subset that is different from that of the sensor data acquired before the change in the setting. That is, the plurality of data included in the first data subset may be sensor data acquired at the time before the change in the setting of the producing equipment or data including information on the operation parameters of the producing equipment, and the plurality of data included in the second data subset may be sensor data acquired at the time after the change in the setting of the producing equipment or data including information related to the operation parameters of the producing equipment. The foregoing particular description of the data included in each data subset is merely illustrative, and the present disclosure is not limited thereto. That is, the processor 110 may select the plurality of different data from each of the plurality of data subsets classified into the different clusters. The processor 110 may generate the plurality of data subsets by clustering the data of the data set. The plurality of data subsets may be classified, for example, by a classification model trained by using a triplet loss-based cost function. Hereinafter, the method of clustering the data of the data set into each of the plurality of data subsets through the classification model will be described in detail with reference to FIGS. 4 and 5.

Figure 4:
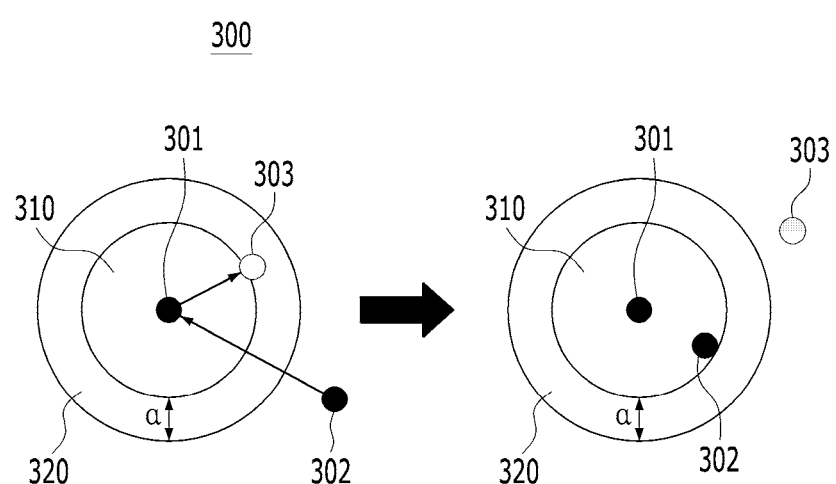
FIG. 4 is a schematic diagram illustrating a method of training a classification model according to the exemplary embodiment of the present disclosure.

FIG. 4 is a schematic diagram illustrating a method of training a classification model according to the exemplary embodiment of the present disclosure.

The classification model of the present disclosure may be trained by the processor 110 so as to form a cluster with similar data in a solution space 300. More particularly, the classification model may be trained so that target data 301 and target similar data 302 are included in one cluster 310, and target dissimilar data 303 is included in a cluster that is different from that of the target data 301 and the target similar data 302. In the solution space of the trained classification model, each cluster may be located to have a predetermined distance margin 320.

The classification model may map each data to the solution space by receiving a training data subset including the target data 301, the target similar data 302, and the target dissimilar data 303, and update a weight of one or more network functions included in the classification model so that the data is clustered according to the labeled cluster information in the solution space. That is, the classification model may be trained so that a distance between the target data 301 and the target similar data 302 and the target dissimilar data 303 is increased in the solution space in order to decrease a distance between the target data 301 and the target similar data 302 in the solution space. The classification model may be trained by using, for example, a triplet based cost function. The triplet based cost function aims to separate a pair of input data of the same classification from third input data of another classification, and a difference value between a first distance (that is, a size of the cluster 310) between the pair of input data of the same classification and a second distance (the distance between the target data 301 or the target similar data 302 and the target dissimilar data 303) between one of the pair of input data of the same classification and the third input data is set to at least a distance margin 320, and the method of training the classification model includes decreasing the first distance to a predetermined ratio of the distance margin or less. Herein, the distance margin 320 may always be a positive number. The weight of one or more network functions included in the classification model may be updated in order to reach the distance margin 320, and the update of the weight may be performed for each iteration or for each one epoch. The detailed contents for the distance margin are disclosed in "FaceNet: A Unified Embedding for Face Recognition and Clustering" of Schroff, etc., and Korean Patent Application Laid-Open No. 10-2018-0068292) the entirety of which is incorporated by reference in the present specification.

The classification model may also be trained as a magnet loss-based model that not only classifies dissimilar data into the cluster, but also considers a semantic relationship between data in one cluster or between different clusters. An initial distance between the center points of the respective clusters in the solution space of the classification model may be corrected during the training process. The classification model may map the data to the solution space and then adjust a location of each data in the solution space based on similarity with the data of the cluster to which each data belongs, the data inside the cluster, and the data outside the cluster. The detailed contents related to the training of the classification model based on the magnet loss are disclosed in "METRIC LEARNING WITH ADAPTIVE DENSITY DISCRIMINATION" by O. Rippel the entirety of which is incorporated by reference in the present specification.

That is, the processor 110 may train the classification model so as to classify the plurality of data included in the data set into the plurality of data subsets according to a specific cluster.

Figure 5:
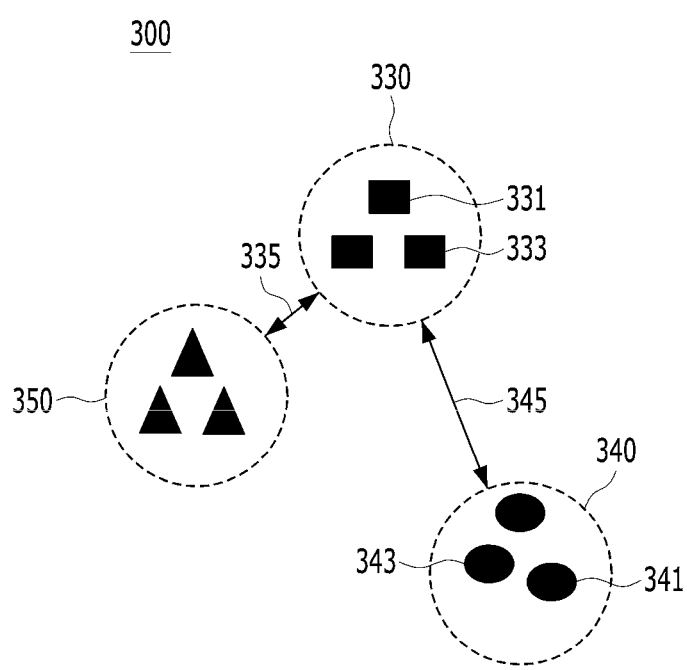
FIG. 5 is a schematic diagram illustrating a solution space of a classification model according to the exemplary embodiment of the present disclosure.

FIG. 5 is a schematic diagram illustrating a solution space of a classification model a according to the exemplary embodiment of the present disclosure.

The solution space 300 illustrated in FIG. 5 is merely an example, and the classification model may include the predetermined number of clusters and the predetermined number of pieces of data for each cluster. Shapes of the data 331, 333, 341, 343, and the like included in the cluster illustrated in FIG. 5 are simply examples for representing that the data are similar to each other.

In the present disclosure, the solution space may be formed of one or more dimensional space and includes one or more clusters, and each cluster may be formed based on the locations in the solution space of characteristic data based on each target data and characteristic data based on target similar data.

In the solution space, the first cluster 330 and the second cluster 340 may be the clusters for the dissimilar data. Further, the third cluster 350 may be the cluster for the data dissimilar to the first and second clusters. The distances 345 and 335 between the clusters may be measures representing the difference between the data included in the respective clusters.

The twelfth distance 345 between the first cluster 330 and the second cluster 340 may be the measure representing the difference between the data belonging to the first cluster 330 and the data belonging to the second cluster 340. Further, the thirteenth distance 335 between the first cluster 330 and the second cluster 340 may be the measure representing the difference between the data belonging to the first cluster 330 and the data belonging to the third cluster 350. In the example illustrated in FIG. 5, the data belonging to the first cluster 330 may be more dissimilar to the data belonging to the second cluster 340 than the data belonging to the third cluster 350. That is, when the distance between the clusters is large, the data belonging to the respective clusters may be more dissimilar, and when the distance between the clusters is small, the data belonging to the respective clusters may be less dissimilar. The distances 335 and 345 between the clusters may be larger than a radius of the cluster by a predetermined ratio or more. The processor 110 may classify the input data based on the location at which characteristic data of the input data is mapped in the solution space of the classification model by computing the input data by using the classification model.

The processor 110 may map the characteristic data of the input data to the solution space of the previously trained classification model by processing the input data by using the previously trained classification model. The processor 110 may classify the input data based on a cluster, to which the input data belongs, among the one or more clusters in the solution space based on the location of the input data in the solution space.

That is, the processor 110 may generate the plurality of data subsets by clustering the plurality of data included in the data set through the trained classification model. For example, the processor 110 may classify the sensor data acquired at the time point before the change in the setting of the producing equipment or the data related to the operation parameter of the producing equipment among the plurality of data included in the data set through the trained classification model into the first data subset, and classify the sensor data acquired at the time point after the change in the setting of the producing equipment or the data related to the operation parameter of the producing equipment into the second data subset.

Accordingly, the processor 110 may classify the input data of the classification model that is the model trained into the cluster through the triplet loss scheme and determine the different data having the normal patterns as data for transformation.

According to the exemplary embodiment of the present disclosure, the processor 110 may determine data for performing transformation on a part of each data among the plurality of data. In particular, the processor 110 may select data that may be utilized as valid data even after the transformation of the data as data for performing transformation. Further, the processor 110 may select data that may be utilized as data including an abnormal state after the transformation of the data as data for performing transformation. Describing in more detail with reference to FIG. 2, the processor 110 may select the plurality of different data in each of the plurality of data subsets classified into the different clusters as data for transforming the data. The processor 110 may select one or more data among the data included in the first data subset 210, and select one or more data among the data included in the second data subset 220. In this case, each of the first data subset 210 and the second data subset 220 may include information about the sensor data acquired at the times before and after the change in the setting of the producing equipment, respectively. That is, the processor 110 may select first data 211 from the first data subset 210 and select third data 221 from the second data subset 220 so that the data is valid as the data for training even after the transformation of the data and is utilized as abnormal data after the transformation.

The processor 110 may also select the plurality of different data from the data subset classified into the same cluster as data for transforming the data. The processor 110 may also select the first data 211 and the second data 212 included in the first data subset 210 that is one cluster as data for transforming the data.

According to the exemplary embodiment of the present disclosure, the processor 110 may transform a part of each of the plurality of selected data. The processor 110 may change values of one or more feature group of each data.

The processor 110 may exchange a value of one data among the plurality of data and a value of another data. The plurality of data may include, for example, the first data and the second data. The processor 110 may exchange a value of a part of the first data and a value of a part of the second data.

In particular, the processor 110 may exchange a value of one or more feature groups of one data among the plurality of data and a value of one or more feature groups of another data. The processor 110 may exchange the values of the data corresponding to the same feature group of the respective data. The processor 110 may exchange a value of the first feature group of the first data and a value of the first feature group of the second data. For example, the processor 110 may exchange the values of the angle sensor feature group of the first joint of the first data and the values of the angle sensor feature group of the first joint of the second data. That is, the values of the associated feature groups are exchanged, so that each data may be the data which is valid itself but includes an abnormal state. For example, when the values of the feature groups that are not completely associated in two or more data are exchanged, there is a possibility that the data itself is not valid, and the data may also be determined as abnormal data by itself. That is, for example, in the case where the values of the feature group related to an operation temperature included in the first data are exchanged with the values of the feature group related to an operation time included in the second data, the data is not valid, so that the data itself may be determined to be abnormal, and thus the data may not be appropriate for training the model. That is, the data in which the values of the different feature groups are exchanged may be the data that does not required much classification performance of the model. However, it is possible to generate the data which itself is valid, but is not in a normal state by exchanging the values included in the associated feature groups. That is, it is possible to generate the data which is abnormal data, but requires much classification performance of the model by generating the data by exchanging the values included in the associated feature groups. That is, the data having a lot of knowledge with which the model is to be trained may be generated.

The feature groups selected from the data included in the different clusters for the exchange may be the associated feature groups. For example, the feature groups selected for the exchange may be the common item in the data included in the different clusters. For example, in the case where the two pieces of data are the data related to the operation of the same robot's arm, the feature group may correspond to each joint of the robot's arm. In this case, for example, the processor 110 may exchange the values of the feature groups related to the same joint.

The associated feature group may be selected so as to generate valid data when the values of the feature groups are exchanged in the two pieces of data. For example, the feature groups selected in the respective data for the exchange may be the feature groups in which the types of values included in the corresponding feature groups and effectiveness correspond to each other. For example, in the case where the two pieces of data are the data related to the operation of the same robot's arm, the feature group may be each joint of the robot's arm.

In another example, the associated feature groups may also be selected with the feature groups in which the states of the data may be changed when the values of the feature groups are exchanged in the two pieces of data. In this case, as described above, the feature group may also be selected so that the data before and after the exchange is valid. For example, in the case where the two pieces of data are the data related to the operation of the same robot's arm, the feature group may be each joint of the robot's arm. Further, for example, the processor 110 may exchange the values of the feature groups related to the different joints. That is, the processor 110 may also exchange the value of the feature group related to the first joint in the first data and the value of the feature group related to the second joint in the second data. In this case, all of the values of the feature group related to the first joint and the values of the feature group related to the second joint may include the values related to the operation angles of the joints, and even though the data is generated by exchanging the values of the feature groups by the foregoing method, the data may have the valid form. The foregoing description is merely illustrative, and the present disclosure is not limited thereto.

For another example, the processor 110 may exchange the values of the feature groups related to the different joints. By exchanging the values of the feature groups related to the different joints, in the case where the data before the exchange is normal state data, the data after the exchange may be in the abnormal state. Further, the values of the feature groups corresponding in the respective data may also be exchanged. However, in this case, the state of the data may not be changed according to the values included in other feature groups, so that the processor 110 may also select the feature group so that the state of the data is changed when the corresponding feature groups are exchanged for the training.

Describing in more detail with reference to FIG. 2, the processor 110 may select the plurality of pieces of different data from the plurality of data subsets classified into the different clusters. The processor 110 may select one or more data among the data included in the first data subset 210, and select one or more data among the data included in the second data subset 220. In this case, each of the first data subset 210 and the second data subset 220 may include information about the sensor data acquired at the times before and after the change in the setting of the producing equipment, respectively. When the second data 212 is selected from the first data subset 210 and the fourth data 222 is selected from the second data subset 220, the processor 110 may change the value of one feature group among the one or more feature groups included in each of the second data 212 and the fourth data 222. The processor 110 may transform the value of each feature group by exchanging 21 the value of the first feature group among the plurality of feature groups included in the second data 212 and the value of the first feature group among the plurality of feature groups included in the fourth data 222. That is, the processor 110 may transform a part of each of the plurality of selected data by selecting the data included in each data subset forming the different cluster and exchanging the values of the data belonging to the same feature group of each selected data. In this case, the transformation of each of the selected data may be performed through the exchange of the values of the data belonging to the same feature group (that is, the exchange of the data values having the association).

The processor 110 may also select two or more data included in the same data subset and change the values of the two or more data. For example, the processor 110 may select the first data 211 and the second data 212 included in the first data subset 210 and generate new data by exchanging 22 the data of the first feature group of the first data 211 and the data of the first feature group of the second data 212. Further, the data generated in this case may also be normal or abnormal according to the values included in another feature group. In the foregoing example, according to the values included in the second and third feature groups, the first data 211 in which the value of the first feature group is changed to the value of the first feature group of the second data 212 may be normal data or abnormal data.

For another example, the processor 110 may select the first data 211 and the second data 212 included in the first data subset 210 and generate new data by exchanging 23 the first feature group of the first data 211 and the second feature group of the second data 212. In this case, the first feature group of the first data 211 may be the feature group consisting of the values related to the angle sensing data of the first joint, and the second feature group of the second data 212 may be the feature group consisting of the values related to the angle sensing data of the second joint. For example, when the first joint and the second joint have the similar specifications and the operation ranges thereof correspond to each other, the valid data may also be generated. That is, the processor 110 transforms the data through the exchange 23 between the feature groups having the association (that is, the feature groups consisting of the values related to the angle sensing data of the joint) even though the feature groups are not completely same, such that a probability that the data is valid is high and the data may be transformed to data including an abnormal state.

Accordingly, as a result of the performance of the operation of selecting the plurality of data and exchanging the values of the feature groups of each data by the processor 110, the normal data included in each data may be transformed to abnormal data. Further, the abnormal data transformed by the processor 110 is not generated through the exchange of the normal data including the different manufacturing recipes, but is generated through the exchange of the same feature group of the respective normal data having the association, so that the abnormal data may be utilized as data for training and testing the neural network. That is, the processor 110 may additionally generate abnormal data for training or testing the neural network through the transformation of each of the plurality of data.

According to the exemplary embodiment of the present disclosure, the processor 110 may assign a label to each of the plurality of transformed data. The processor 110 may assign an abnormal label to each of the plurality of transformed data. In particular, the processor 110 may select the plurality of data from each of the plurality of data subsets forming the different clusters, and generate abnormal data through the transformation of a part of each of the plurality of data selected by exchanging the values of the data belonging to the same feature group of each selected data. Further, the processor 110 may assign a pseudo abnormal label to each of the plurality of generated abnormal data. The pseudo abnormal label may be a hard label or a soft label. The pseudo abnormal label may be, for example, a label representing that the corresponding data is abnormal, and may also represent a probability that the corresponding data is abnormal (for example, a value obtained in consideration of a ratio of the changed feature group occupied in the data). The foregoing description is merely illustrative, and the present disclosure is not limited thereto.

For example, the processor 110 may select the first data and the second data from the data set including the plurality of data, and exchange the specific feature groups of the first data and the second data. In this case, the first data includes a value of the specific feature group of the second data and the second data includes a value of the specific feature group corresponding to the first data, so that each transformed data may be abnormal data. In this case, the processor 110 may assign the label that is the pseudo abnormal data to each data. The particular description for the process of generating abnormal data through each data is merely illustrative, and the present disclosure is not limited thereto.

That is, the processor 110 exchanges one or more feature groups included in each of the plurality of data and assigns the pseudo abnormal label to each of the transformed data (that is, each abnormal data), thereby training the model so that the model detects whether the data is abnormal.

In general, the neural network model for detecting an anomaly based on specific data may be pre-trained through training data including normal data and abnormal data. That is, in the process of pre-training the neural network model so that the model detects whether the data is abnormal, both normal data and abnormal data need to be constructed. However, the abnormal data for training the neural network includes time-series information, so that it is difficult to secure (or construct) the abnormal data, and lots of time may be required for constructing the corresponding abnormal data. In the present disclosure, it is possible to generate abnormal data by transforming data by exchanging the same feature group of each normal data, so that it is not necessary to separately construct abnormal data, thereby being easy to construct training data. Further, the abnormal data generated by transforming the plurality of data of the present disclosure is generated through the exchange of the values of the data belonging to the same feature group (that is, the exchange of the data values having the association), not through the simple transformation of a partial portion of each data to a different value (for example, addition noise to specific data), so that it is possible to generate training data appropriate to train the neural network (for example, the anomaly detection model).

According to the exemplary embodiment of the present disclosure, the processor 110 may compute the transformed data by using the model. In the exemplary embodiment of the present disclosure, the model may be used for detecting anomaly. The processor 110 may test performance of the model by computing the transformed data by using the model. The processor 110 may test performance of the model based on whether the model determines the transformed data to be abnormal. For example, the processor 110 may transform the first data and the second data by exchanging the first feature groups among the plurality of feature groups included in the first data and the second data. Further, the processor 110 may output whether each data is an anomaly by using each of the transformed first data and second data (that is, abnormal data) as an input of the model. When the output result of the model includes information that the anomaly is detected in the first data and information that the anomaly is detected in the second data, the processor 110 may determine that performance of the corresponding model is appropriate.

For another example, when the output result of the model includes information that the anomaly is not detected in at least one data between the first data and the second data, the processor 110 may determine that performance of the corresponding model is inappropriate. The particular description for whether the anomaly is detected output based on the first data and the second data is merely illustrative, and the present disclosure is not limited thereto.

That is, a test of performance of the neural network model that is trained in an environment in which a text data set is not constructed may be possible. That is, even though a separate test set for testing the trained neural network model is not constructed, it is possible to perform a test for the trained neural network model by generating abnormal data through the transformation of the plurality of data.

Accordingly, it is not necessary to separately construct a test set, training of the neural network and performance test are simplified, thereby improving efficiency of the generation of the neural network model detecting anomaly (that is, anomaly detecting model).

Figure 3:
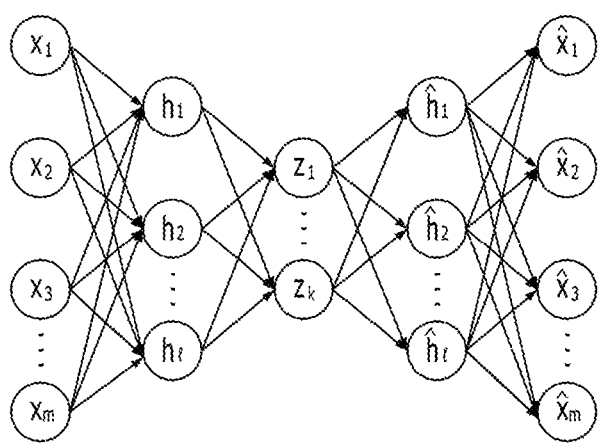
FIG. 3 is a diagram illustrating an example of a plurality of data configuring a data set according to the exemplary embodiment of the present disclosure.

FIG. 3 is a schematic diagram illustrating a network function according to the exemplary embodiment of the present disclosure.

Throughout the present specification, a computation model, a nerve network, the network function, and the neural network may be used with the same meaning. The neural network may be formed of a set of interconnected calculation units which are generally referred to as "nodes." The "nodes" may also be called "neurons." The neural network consists of one or more nodes. The nodes (or neurons) configuring the neural network may be interconnected by one or more "links."

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the parameter assigned to each of the links. For example, when there are two neural networks in which the numbers of nodes and links are the same and the weights between the links are different, the two neural networks may be recognized to be different from each other.

The neural network may consist of one or more nodes. Some of the nodes configuring the neural network may form one layer based on distances from an initial input node. For example, a set of nodes having a distance of n from an initial input node may form n layers. The distance from the initial input node may be defined by the minimum number of links, which needs to be passed from the initial input node to a corresponding node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which are not included in other input nodes connected through the links in a relationship between the nodes based on the link in the neural network. Similarly, the final output node may mean one or more nodes which do not have an output node in a relationship with other nodes among the nodes in the neural network. Further, the hidden node may mean nodes configuring the neural network, not the initial input node and the final output node. In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize the latent structures of pictures, texts, videos, voices, and music (for example, an object included in the picture, the contents and the emotion of the text, and the contents and the emotion of the voice). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, Siamese network, and the like. The foregoing description of the deep neural network is merely illustrative, and the present disclosure is not limited thereto.

In the exemplary embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). In this case, in the example of FIG. 3, the dimension reduction layer and the dimension restoration layer are illustrative to be symmetric, but the present disclosure is not limited thereto, and the nodes of a dimension reduction layer may or may not be symmetric to the nodes of a dimension restoration layer. The auto encoder may perform a nonlinear dimension reduction. The number of input layers and the number of output layers may correspond to the number of sensors left after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be learned by at least one scheme of supervised learning, unsupervised learning, and semi-supervised learning. The learning of the neural network is for the purpose of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a weight of each of the nodes of the layers of the neural network may be updated according to the backpropagation. A variation rate of the updated weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the learning of the neural network, the training data may be generally a subset of actual data (that is, data to be processed by using the learned neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of omitting a part of nodes of the network during the learning process, and the like may be applied.

According to the exemplary embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. The logical relationship between the data elements may include a connection relationship between the data elements that the user thinks. The physical relationship between the data elements may include an actual relationship between the data elements physically stored in a computer readable storage medium (for example, a hard disk). In particular, the data structure may include a set of data, a relationship between data, and a function or a command applicable to data. Through the effectively designed data structure, the computing device may perform a computation while minimally using resources of the computing device. In particular, the computing device may improve efficiency of computation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a computation model, a nerve network, the network function, and the neural network may be used with the same meaning (hereinafter, the present disclosure will be described based on the unification to the neural network). The data structure may include a neural network. Further, the data structure including the neural network may be stored in a computer readable medium. The data structure including the neural network may also include data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may be formed of the entirety or a predetermined combination of data input to the neural network, a weight of the neural network, a hyper parameter of the neural network, data obtained from the neural network, an active function associated with each node or layer of the neural network, and a loss function for training of the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, a weight and a parameter may be used as the same meaning). Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and the parameter set in the link corresponding to each of the input nodes. The foregoing data structure is merely an example, and the present disclosure is not limited thereto.

For a non-limited example, the weight may include a weight varied in the neural network training process and/or the weight of the training completed neural network. The weight varied in the neural network training process may include a weight at a time at which a training cycle starts and/or a weight varied during a training cycle. The weight of the training completed neural network may include a weight of the neural network completing the training cycle. Accordingly, the data structure including the weight of the neural network may include the data structure including the weight varied in the neural network training process and/or the weight of the training completed neural network. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the computation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight to be weight-initialized), and the number of hidden units (for example, the number of hidden layers and the number of nodes of the hidden layer). The foregoing data structure is merely an example, and the present disclosure is not limited thereto.

Figure 6:
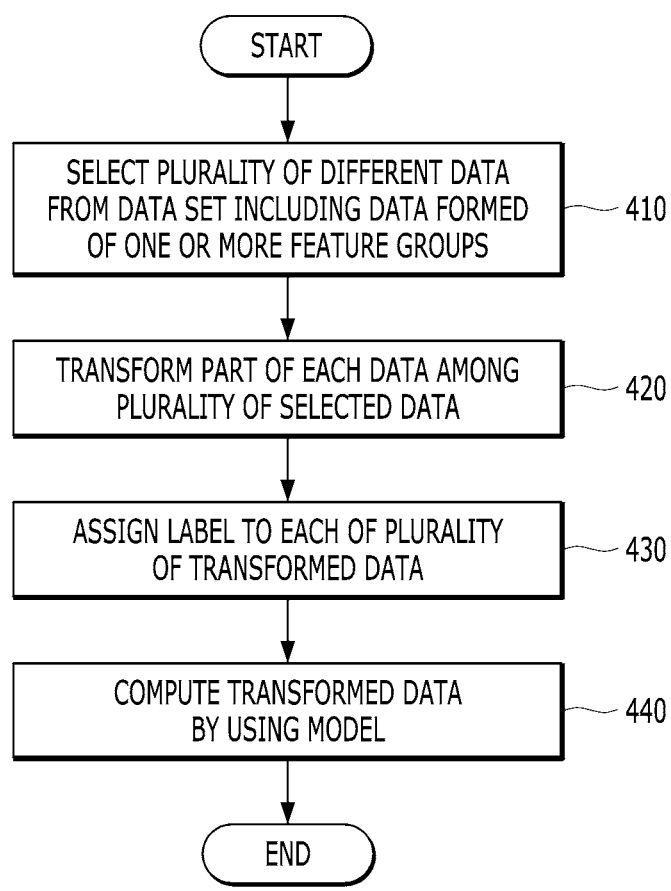
FIG. 6 is a flowchart for performing data processing according to an exemplary embodiment of the present disclosure.

FIG. 6 is a flowchart for performing data processing according to an exemplary embodiment of the present disclosure.

According to the exemplary embodiment of the present disclosure, the computing device 100 may select a plurality of different data from a data set including data formed of one or more feature groups (410).

According to the exemplary embodiment of the present disclosure, the computing device 100 may transform a part of each data among the plurality of selected data (420).

According to the exemplary embodiment of the present disclosure, the computing device 100 may assign a label to each of the plurality of transformed data (430).

According to the exemplary embodiment of the present disclosure, the computing device 100 may compute the transformed data by using the model (440).

An order of the operations illustrated in FIG. 6 may be changed as necessary, and one or more operations may be omitted or added. That is, the foregoing operations are merely the exemplary embodiment of the present disclosure, and the scope of the present disclosure is not limited thereto.

Figure 7:
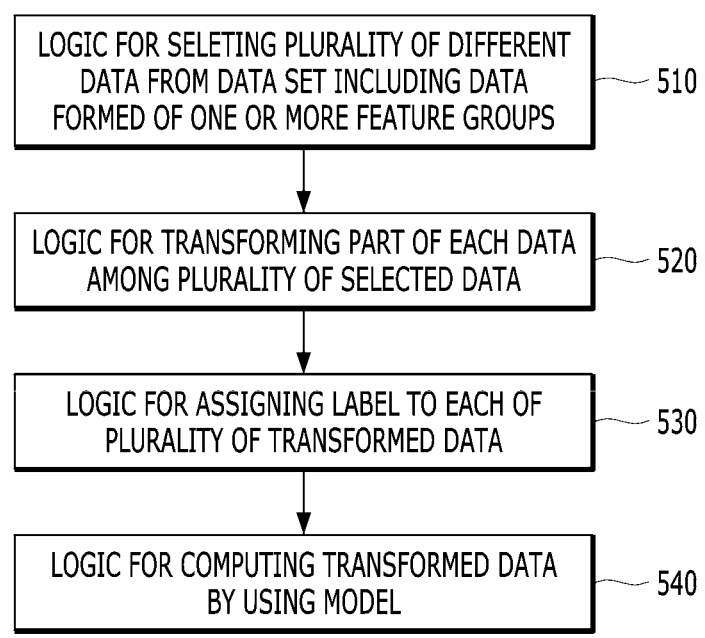
FIG. 7 is logic for implementing a method of performing data processing according to an exemplary embodiment of the present disclosure.

FIG. 7 is a diagram illustrating logic for implementing a method of performing data processing according to an exemplary embodiment of the present disclosure.

According to the exemplary embodiment of the present disclosure, the computing device 100 may be implemented by logic below.

According to the exemplary embodiment of the present disclosure, the computing device 100 may include logic 510 for selecting a plurality of different data from a data set including data formed of one or more feature groups, logic 520 for transforming a part of each data among the plurality of selected data, logic 530 for assigning a label to each of the plurality of transformed data, and logic 540 for computing the transformed data by using the model.

In an alternative exemplary embodiment, the plurality of different data may be formed of data included in the same cluster or different clusters.

In the alternative exemplary embodiment, the computing device 100 may further include logic for generating a plurality of data subsets by clustering the data of the data set.

In the alternative exemplary embodiment, the logic for generating the plurality of data subsets by clustering the data of the data set may be performed by a classification model trained by using a triplet loss-based cost function.

In the alternative exemplary embodiment, each of the plurality of data subsets may include different data of a normal pattern.

In the alternative exemplary embodiment, the logic for transforming the part of each data among the plurality of selected data may include logic for changing a value of one feature group among the one or more feature groups of each data.

In the alternative exemplary embodiment, the logic for transforming the part of each data among the plurality of selected data may include logic for exchanging a value of one data among the plurality of data with a value of another data.

In the alternative exemplary embodiment, the logic for exchanging the value of one data among the plurality of data with the value of another data may include logic for exchanging a value of one or more feature groups of one data among the plurality of data with a value of one or more feature groups of another data.

In the alternative exemplary embodiment, the logic for exchanging the value of one data among the plurality of data with the value of another data may include logic for exchanging values of the data belonging to the same feature group of each data.

In the alternative exemplary embodiment, the data included in the data set may be normal data.

In the alternative exemplary embodiment, the logic for assigning the label to each of the plurality of transformed data may include logic for assigning an abnormal label to each of the plurality of transformed data.

In the alternative exemplary embodiment, the logic for computing the transformed data by using the model may include logic for testing performance of the model by computing the transformed data by using the model.

In the alternative exemplary embodiment, the logic for testing performance of the model by computing the transformed data by using the model may include logic for testing performance of the model based on whether the model determines the transformed data to be abnormal.

In the alternative exemplary embodiment, each of the feature groups may be formed of associated items among the plurality of items included in the data.

According to the exemplary embodiment of the present disclosure, the logic for implementing the computing device 100 may be implemented by means, circuits, or modules for implementing the computing program.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

Figure 8:
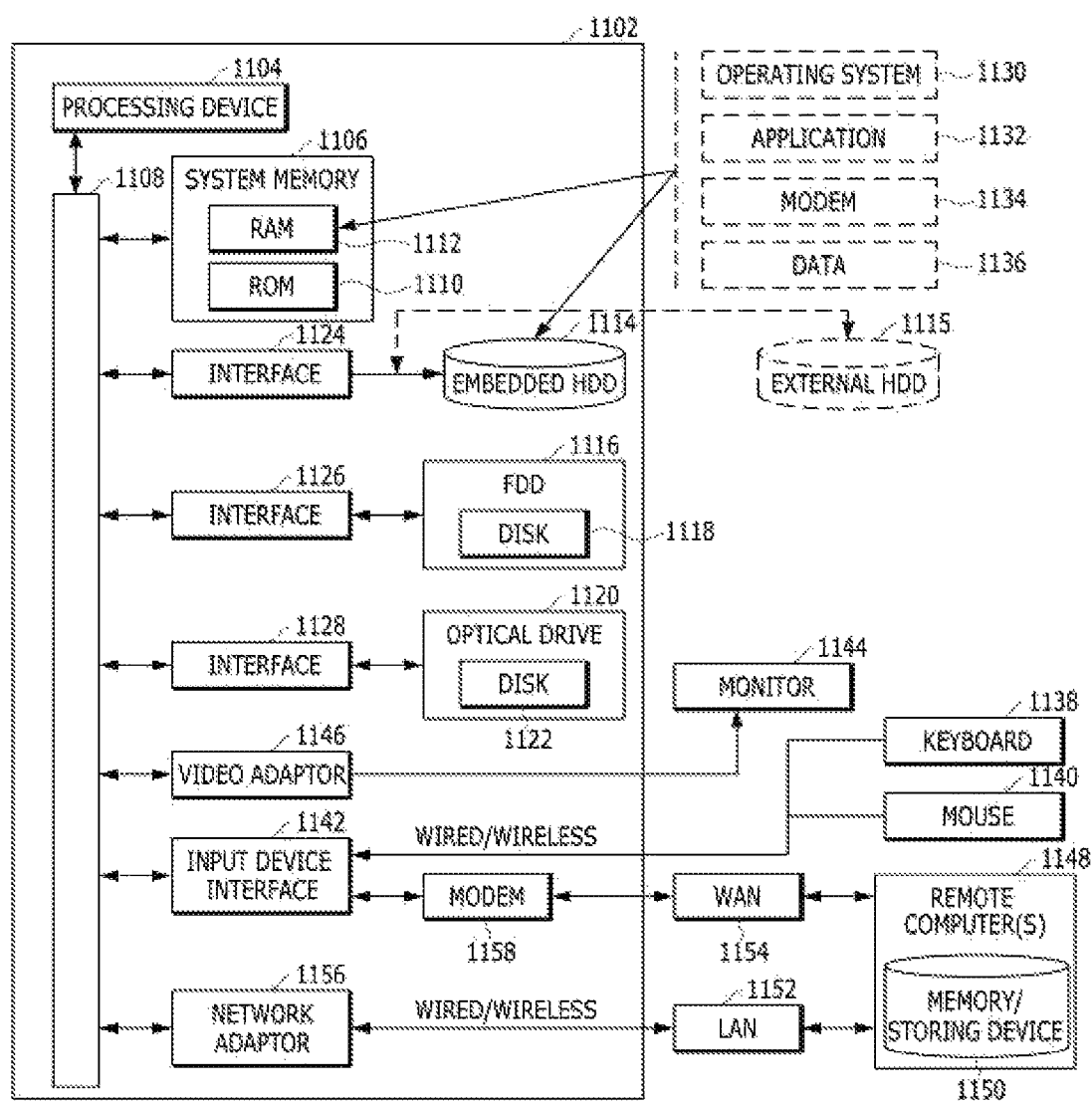
FIG. 8 is a simple and general schematic diagram illustrating an example of a computing environment in which exemplary embodiments of the present disclosure are implementable.

FIG. 8 is a simple and general schematic diagram illustrating an example of a computing environment in which exemplary embodiments of the present disclosure are implementable.

The present disclosure has been generally described in relation to a computer executable command executable in one or more computers, but those skilled in the art will appreciate well that the present disclosure is combined with other program modules and/or be implemented by a combination of hardware and software.

In general, a program module includes a routine, a procedure, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. Any kind of computer accessible medium may be the computer readable medium, and the computer readable medium may include a computer readable storage medium and a computer readable transmission medium. The computer readable storage medium may include a volatile and non-volatile media, and transitory and non-transitory media. The computer readable storage medium includes volatile and non-volatile media, and portable and non-portable media implemented with a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium includes information transport media implementing a computer readable command, a data structure, a program module, or other data in a modulated data signal, such as a carrier wave or other transport mechanisms. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors 110. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-transitory computer readable medium having contents which cause one or more processors of a computing device to perform a method, the method comprising:
    receiving a plurality of different data in a data set including data comprised of one or more feature groups obtained by a sensor, the plurality of different data in a data set including data acquired by the sensor before a setting change of an equipment coupled to the sensor and data acquired by the same sensor after the setting change of the same equipment coupled to the same sensor;
    selecting, by a processor among the one or more processors, the plurality of different data in the data set including data comprised of one or more feature groups;
    transforming, by the processor, a value for one or more feature groups included in each data among the plurality of different data;
    assigning, by the processor, an abnormal label to each transformed data;
    calculating, by the processor, the transformed data using a model;
    classifying the data acquired before the setting change in the equipment through a trained classification model into a first data subset; and
    classifying the data acquired after the setting change in the equipment through the trained classification model into a second data subset,
    wherein the setting change of the equipment includes changing of operation parameters of the equipment.

2. The non-transitory computer readable medium according to claim 1, wherein the plurality of different data is comprised of data included in a same cluster or different clusters.

3. The non-transitory computer readable medium according to claim 1, wherein the method further comprises generating a plurality of data subsets through clustering data of the data set.

4. The non-transitory computer readable medium according to claim 3, wherein the generating a plurality of data subsets through clustering data of the data set includes processing by a classification model trained by using a cost function based on triple loss.

5. The non-transitory computer readable medium according to claim 3, wherein each data subset in the plurality of data subsets includes different data having a normal pattern.

6. The non-transitory computer readable medium according to claim 1, wherein the transforming a part of each data from the selected different data includes exchanging value for one data and value for another data among the plurality of data.

7. The non-transitory computer readable medium according to claim 6, wherein the exchanging value for one data and value for another data among the plurality of data includes exchanging value for one or more feature groups in one data and value for one or more feature groups in another data among the plurality of data.

8. The non-transitory computer readable medium according to claim 6, wherein the exchanging value for one data and value for another data among the plurality of data includes exchanging values for data belonging to a same feature group in each data.

9. The non-transitory computer readable medium according to claim 1, wherein the data included in the data set is a normal data.

10. The non-transitory computer readable medium according to claim 1, wherein the calculating the transformed data using a model includes testing a performance of the model through calculating the transformed data using the model.

11. The non-transitory computer readable medium according to claim 10, wherein the testing a performance of the model through calculating the transformed data using the model includes testing the performance of the model based on whether or not the transformed data is judged abnormally by the model.

12. The non-transitory computer readable medium according to claim 1, wherein each feature group is comprised of items associated among a plurality of items included in the data.

13. A method for processing data performed in a computing device including one or more processors, comprising:
    receiving a plurality of different data in a data set including data comprised of one or more feature groups obtained by a sensor, the plurality of different data in a data set including data acquired before and after a setting change of an equipment coupled to the sensor, wherein the setting change of the equipment includes changing of operation parameters of the equipment;

selecting, by a processor among the one or more processors, the plurality of different data in the data set including data comprised of one or more feature groups;

transforming, by the processor, a value for one or more feature groups included in each data among the plurality of different data;

assigning, by the processor, an abnormal label to each transformed data;

calculating, by the processor, the transformed data using a model, classifying the data acquired before the setting change in the equipment through a trained classification model into a first data subset; and classifying the data acquired after the setting change in the equipment through the trained classification model into a second data subset.

14. A computing device, including:

one or more processors; and a memory storing commands executable in processor, wherein the processor is configured to:

receive a plurality of different data in a data set including data comprised of one or more feature groups obtained by a sensor, the plurality of different data in a data set including data acquired before and after a setting change of an equipment coupled to the sensor;

select the plurality of different data in the data set including data comprised of one or more feature groups;

transform a value for one or more feature groups included in each data among the plurality of different data;

assign an abnormal label to each transformed data;

calculate the transformed data using a model, classify the data acquired before the setting change in the equipment through a trained classification model into a first data subset; and classify the data acquired after the setting change in the equipment through the trained classification model into a second data subset.

15. The non-transitory computer readable medium according to claim 1, wherein the contents comprise instructions executed by the one or more processors of the computing device.

16. A non-transitory computer readable medium having contents which cause one or more processors of a computing device to perform a method, the method comprising:

receiving a plurality of different data in a data set including data comprised of one or more feature groups obtained by a sensor, the plurality of different data in a data set including data acquired by the sensor before a setting change of an equipment coupled to the sensor and data acquired by the same sensor after the setting change of the same equipment coupled to the same sensor;

selecting, by a processor among the one or more processors, the plurality of different data in the data set including data comprised of one or more feature groups;

transforming, by the processor, a value for one or more feature groups included in each data among the plurality of different data;

assigning, by the processor, an abnormal label to each transformed data;

calculating, by the processor, the transformed data using a model selecting a first data from a first data subset, the first data including one or more feature groups;

selecting a second data from the second data subset, the second data including one or more feature groups; and using the first data and the second data for training the model after transforming the value for one or more feature groups included in each data among the plurality of different data, including:

using the first data and the second data as abnormal data for training the model after transforming the value for one or more feature groups included in each data among the plurality of different data.

\* \* \* \* \*